United States Patent [19]
Ajero

[11] 3,780,582
[45] Dec. 25, 1973

[54] LIQUID PROPORTIONAL MEASURING DEVICE

[76] Inventor: Fortunato S. Ajero, 521 S. Rawson Ct., South Milwaukee, Wis. 53172

[22] Filed: Dec. 29, 1971

[21] Appl. No.: 213,584

Related U.S. Application Data

[63] Continuation-in-part of Ser. No. 189,710, Oct. 15, 1971, abandoned.

[52] U.S. Cl. .................................. 73/320, 137/558
[51] Int. Cl. .............................................. G01f 23/08
[58] Field of Search ..................... 73/320, 319, 311, 73/305, 309, 310; 116/118 R; 220/86 R; 141/37; 137/558; 74/405

[56] References Cited
UNITED STATES PATENTS

| 711,521 | 10/1902 | Parmelee | 73/311 |
|---|---|---|---|
| 2,908,289 | 10/1959 | Everett | 137/558 X |
| 2,989,874 | 6/1961 | Johnson | 74/405 |
| 1,570,481 | 1/1926 | Grain et al. | 73/320 X |
| 3,168,904 | 2/1965 | Conover | 137/558 |
| 2,660,059 | 11/1953 | Dean et al. | 73/313 |
| 941,061 | 11/1909 | Connet | 73/311 |

Primary Examiner—Richard C. Queisser
Assistant Examiner—Daniel M. Yasich
Attorney—Allan B. Wheeler

[57] ABSTRACT

The gauge is for a tank which is to contain mixed liquids desirably kept in fixed proportionate ratio regardless of the amount of liquid in the tank when filling is started. The drive to the gauge indicator has a gear shift device set to engage at a high ratio when the filling with the low volume liquid is started. Then the indicator will move to "Full" from any position in response to the introduction of only the lower volume of liquid which is proper for the space to be filled. When the drive is then shifted to disengaged position, the indicator will return to the position appropriate to show the proper volume of the high ratio liquid and that needed to fill the tank. For example, in a tank of a fuel and oil mixture for a two-cycle engine, when the gauge drive is set to receive oil, it will register the proper amount of required oil in moving to full position regardless of where the mixture level stood when oil introduction started. Likewise, when the drive is set to receive fuel, it will register the proper amount of fuel in moving to full position, regardless of where the mixture level stood when introduction started.

7 Claims, 4 Drawing Figures

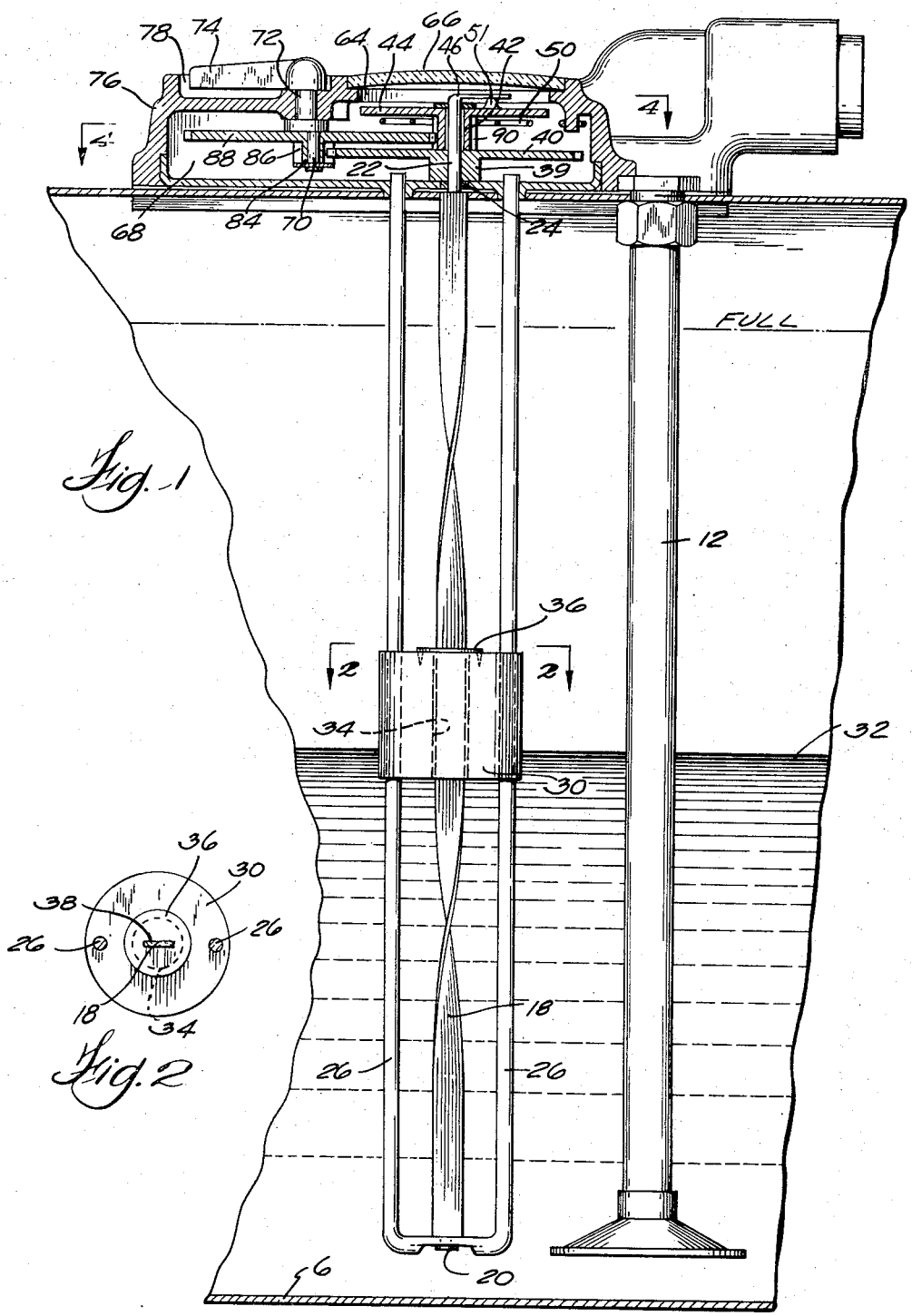

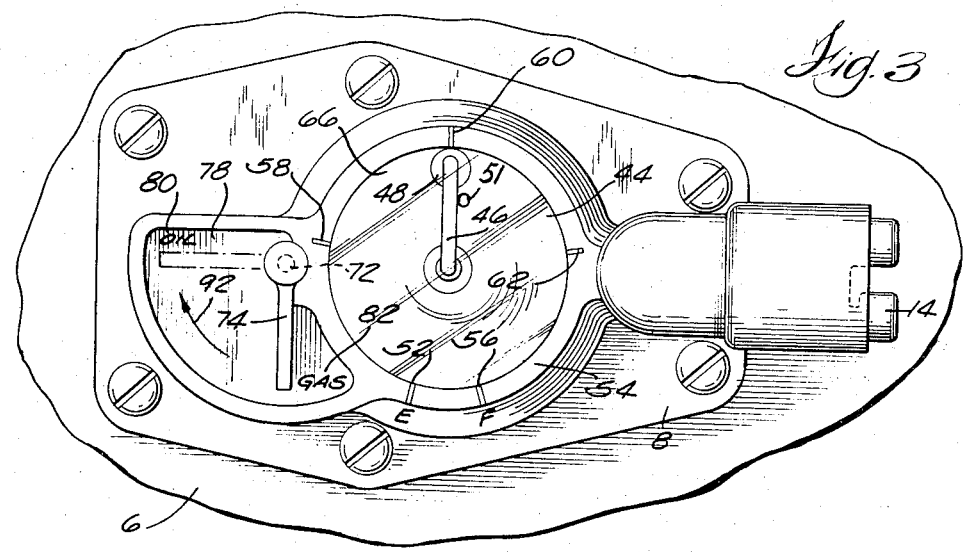
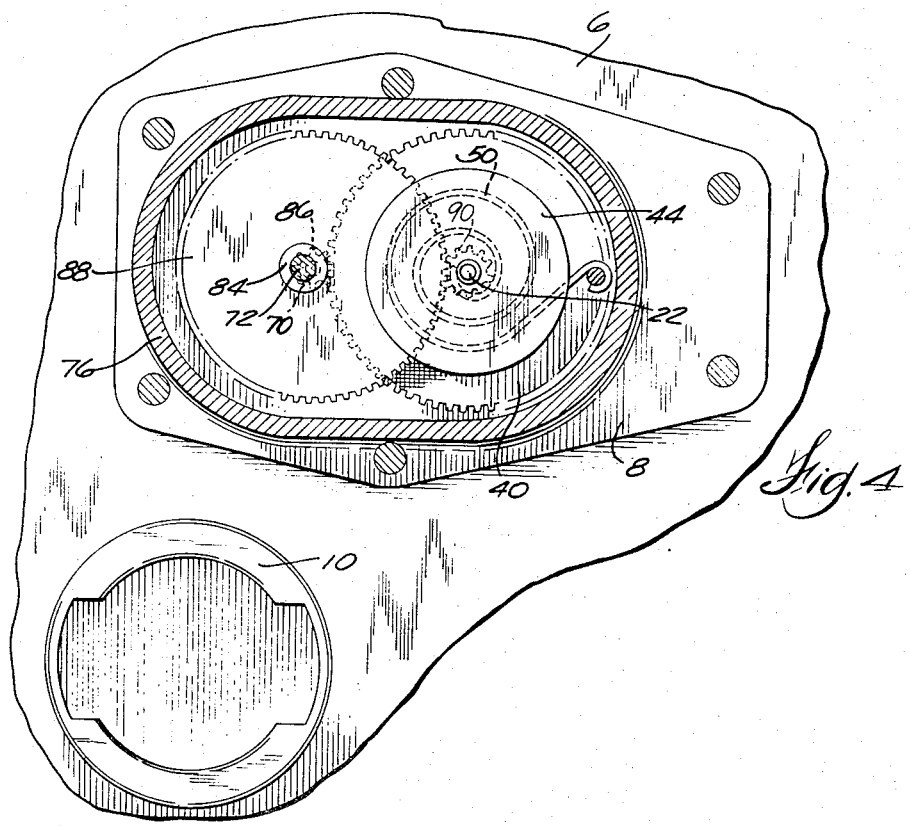

LIQUID PROPORTIONAL MEASURING DEVICE

The present application is a continuation-in-part of my parent application Ser. No. 189,710 filed Oct. 15, 1971, now abandoned.

BACKGROUND OF INVENTION

Mixing of fuel and oil for a two-cycle engine has heretofore been a nuisance entailing either mixing a batch of oil and fuel in a separate tank to complete the filling of the service tank with the mixture, or calculating in advance the amount of oil and fuel required to fill the tank from its particular starting point. By using the instant device it is immaterial what the mixture level in the service tank might be at the time filling is commenced. The control on the gauge is first set so that the gauge will register the amount of oil required to fill the tank, and the oil is added. Thereupon filling the tank with fuel, after a resetting of the control to register the amount of fuel required to fill the tank, will leave the mixture in the desired proportion regardless of how much oil and fuel had to be added.

SUMMARY OF INVENTION

The invention is not limited to a float-actuated gauge, nor to a gauge for a tank in which proportions of oil and gasoline are to be maintained during refilling. Other fluids may similarly be handled. By way of exemplification, an appropriate gauge actuator may include a float. A driving connection from the sensor to the gauge indicator includes a direct drive and an intermediate gear drive of appropriate ratio, and having a lever which the operator may use to change the ratio according to whether he is putting in oil or gasoline. Starting with the oil, he sets the register drive gearing to register the amount of oil inserted. Assuming that the oil is to be used in the ratio of one-fiftieth part oil to one part of the total mixture, the gearing will move the register to show "Full" when the amount of oil introduced is one-fiftieth of whatever liquid may be required to fill the tank. When the register is then readjusted for indicating the required amount of gasoline, the indicator immediately returns to the correct showing of the intermediate level of the total mixture then in the tank. When gasoline is then inserted to fill the tank, the level of mixture finally shown by the gauge indicator will reach the "Full" mark only upon introduction of the precise amount of gasoline which was required to effect a proper mixture with the amount of oil previously incorporated.

Other ratios of mixtures of other materials may be achieved in like manner.

In its broad aspect the invention comprises a gauge for a tank in which two fluids are to be mixed in fixed proportions, the gauge having a first movable part which at all times is positioned in accordance with the amount of the mixture actually present in the tank, a second movable part incorporating an indicator movable to positions showing liquid levels within the tank, and drive means which are selectively operable or inoperable to drive the second part bearing the indicator from the first part at a drive ratio which is the inverse of the desired ratio of one of the two fluids within the tank to the entire volume, and means urging the second part to show the same reading as the first part effective when the drive means is in its inoperable position. Preferably both the first and the second parts are visible indicators.

DESCRIPTION OF DRAWINGS

FIG. 1 is a view in section through a tank adapted to hold fixed proportions of two fluids, and equipped with a gauge in accordance with the present invention.

FIG. 2 is a view taken in section on line 2—2 of FIG. 1.

FIG. 3 is a plan view of the gauge, the tank being broken away.

FIG. 4 is a view taken in section on the line 4—4 of FIG. 1 when the control lever is set to receive oil.

DETAILED DESCRIPTION

Merely by way of exemplification, the tank illustrated is one which may be used for a mixture of fuel and oil for use with a two-cycle engine. There is a tank 6 having in its top a mounting 8 for a gauge which will facilitate the metering of the component liquids to give the proper proportions in the tank regardless of how much of the previous mixture may be left when filling is started. Whatever liquids are to be placed in the tank, either individually or previously mixed, can be introduced through the conventional filler neck 10. Depending from the gauge mounting 8 is a tube 12 having the usual fuel line connection 14, which is shown incidentally in FIG. 3 but constitutes no part of the present invention.

Any desired type of gauge and any type of gauge actuator may be used. The instant exemplification shows an actuator which consists of a spindle 18 in the form of a twisted strip mounted on a lower bearing 20 and having a shaft 22 through an upper bearing 24. The lower bearing is supported by guide rods 26 fastened to the mounting member 8, along which the float 30 is guided for upward and downward movement according to the level 32 of the mixture in the tank 6. The float has an opening 34 through which passes the helically twisted strip 18. Spanning this opening is a disk 36 which has a slot 38 closely fitting the helical strip 18 so that as the float moves upwardly or downwardly, the strip 18 is constrained to rotate clockwise or counter-clockwise by engagement of the helix in the strip 18, by the disk 36 fixed to the float, float 30 being unable to rotate because of its engagement with guide rods 26 which permit vertical movement but not rotation.

Spindle or shaft 22 fixed to strip 18 terminates in a pointer consisting of a bar 46 comprising a first indicator which moves relative to the marks 52, 56, 58, 60, 62 on ring 54 to indicate the liquid level 32 at all times. Fixed on the spindle 22 for rotation therewith is the hub 39 of gear 40. Freely rotatable on spindle 22 above hub 39 is the hub 42 of the second indicator 44. As shown, the second indicator 44 consists of a disk having on its upper surface a spot 48. A light coil spring 50 urges the disk 44 to move the indicator spot 48 to a position aligned with bar 46 to show the same liquid level. A dimple 51, or other stop (FIG. 3) prevents disk 44 from turning farther toward the "E" or empty mark than will suffice to align second indicator spot 48 with bar 46 under the urging of spring 50 (when disk 44 is free to turn as described below).

The positions of the spot 48 and bar 46 are visible at all times through an opening 64 for which a transparent closure 66 is provided to retain the contents of the tank.

In a chamber 68 laterally offset from the gears 40 and 90, there is an eccentric 70 mounted on a manually controllable rock shaft 72 having a handle 74. The top of the closure member 76 has a recess 78 in which the handle 74 may be oscillated on rock shaft 72 between a first position designated by the legend "Oil" 80 and the second position by the legend 82 which may consist of the word "Gas," referring to the fuel which is to be mixed with the oil.

Rotatably mounted on the off-center eccentric shaft 70 is the hub 84 of a compound gear which comprises a smaller pinion 86 and a larger gear 88. When the gear 88 meshes with the small pinion 90 on the hub 42 of disk 44, the teeth of pinion 86 on the hub of gear 88 will concurrently mesh with the toothed periphery of the gear 40 driven by the spindle 22 of the actuator of the gauge. This will occur when the control lever 74 is moved in the direction of arrow 92 to the legend 80 shown in FIG. 3. In this position the motion produced by float 30 in the spindle 22 and bar 46 is transmitted through the gear 40 to the pinion 86 and thence through the hub 84 and gear 88 to the pinion 90 on the hub 42 of the disk 44 which carries the spot 48.

When the control lever 74 is in position to transmit motion through this train of gears, it will be apparent that the second indicator spot 48 will move much farther in response to given float movement than would otherwise be the case. If the desired ratio is one part oil to 50 parts gasoline, the drive from shaft 22 to indicator 48 on disk 44 is in the ratio 50 to one, or the inverse of the desired proportion of the oil to the final volume. If the fluids are to be mixed in equal parts the drive is in the ratio two to one, the inverse of the ratio of one fluid to the whole.

Assuming that the tank 6 was partially full of 50 to one gasoline and oil as indicated by the level 32 shown in FIG. 1, the amount of oil required to complete the mixture which will fill the tank will be only one-fiftieth of the total of the empty portion of the volume of tank 6. Because spot 48 moves at 50 times the speed of bar 46, the introduction of this relatively small amount of oil will suffice to raise the float 30 to a distance which will cause the spot 48 (but not bar 46) to indicate that the tank is full as long as lever 74 is in the position engaging the drive from bar 46 to spot 48.

When spot 48 indicates that the tank is full, the operator ceases to introduce oil into the tank filler opening 10 and shifts the control lever 74 to the station shown by legend 82. This, by oscillation of the eccentric shafts 70, 72 will withdraw the gear 88 from meshing with pinion 90 and will concurrently withdraw the gear 86 from meshing with gear 40. The spot 48 on the disk 44 will then move away from registry with the mark 56 which indicates that the tank is full under the urging of spring 50, since disk 44 is now free on shaft 22. The bar or pointer 46 on the upper end of spindle 22 will remain in the illustrated full line position in which its registration with the mark 60 shows the tank to be only half full. (Its contents will be, first, the original volume of mixture, and, secondly, the relatively small amount of lubricating oil added with the guidance of the stepped-up actuator.) Dimple 51 on disk 44 stops the disk from rotating when spot 48 aligns with bar 46. When fuel is now introduced through the filler neck 10 to move the bar 46 into registry with line 56, disk 44 with its dimple engaging bar 46, is likewise brought into registry with line 56, the tank will be full in fact, and the mixture will be in proper proportion of fuel and oil.

It is necessary to provide means to assist return of the gauge, which may be in the form of a light spring 50 as shown. Also other stop means may be used between indicators, and other gauge actuating structure may be used according to the requirements of the fluids and the service to which the device is put. The important aspect of the invention is the second indicator driven at the inverse of the desired fluid ratio between one fluid and the total volume of mixed fluids, the drive being effective only when filling with that fluid.

I claim:

1. The combination with a fillable container for a mixture of fluids, of a gauge having a first indicator, actuator means connected to move the first indicator to positions corresponding with actual fluid levels of said mixture, a second indicator mounted to move relative to said first indicator to indicate a gauge reading relative to only one fluid of said mixture, and selectively operable drive means between the first indicator and the second indicator engageable to drive the second indicator relative to the first indicator at a ratio inverse to the desired ratio between said one fluid and said mixture.

2. The device of claim 1 further comprising means to align said first and second indicators when said selectively operable drive to drive the second indicator is disengaged.

3. The device of claim 1 in which the actuator means comprises a float mounted for vertical movement in said container and constrained against rotation and a rotatable spindle having a portion connected to rotate upon vertical movement of the float.

4. The device of claim 1 in which a spindle comprises a part of said actuator, and said drive means includes a first gear secured to the spindle, a second gear connected with the second indicator means, and a third compound gear having teeth at one radius adapted to mesh with the first gear and teeth at another radius adapted to simultaneously mesh with the second gear, whereby to drive the second indicator at said ratio relative to the first indicator when said third gear is meshed with said first and second gears, and means adapted to move the third gear to and from a position in which it will mesh with the first and second gears for selective operation of said drive means.

5. The device of claim 1 in which the actuator means comprises a spindle having a flat twisted helical portion, a float in said container reciprocable along said helical portion and connected to rotate the spindle according to the vertical position of the float, said first gauge indicator being rotatably mounted in a visible position on said tank and rotatable with the spindle, said drive means comprising a gear fixed to rotate with the spindle, a pinion freely rotatable coaxially with respect to the spindle, and a unitary compound gear having sets of gear teeth respectively meshing with the spindle gear and with the free pinion, an eccentrically rotatable shaft upon which said unitary compound gear is rotatably mounted, means for oscillating said shaft for effecting engagement of the compound gear with the spindle gear and with the free pinion, said second indicator being moved by the free pinion, and means to align said first and second indicators when said compound gear is disengaged from said free pinion.

6. The device of claim 5 in which said second indicator comprises a disk connected to the freely rotatable pinion and a visible mark on the face of said disk, said alignment means comprising a stop on said disk positioned to rest against said first indicator when said first and second indicators are at the same reading, and spring means urging said second indicator to rotate toward said position of alignment when said indicator indicates a higher reading of said gauge than said first indicator.

7. The device of claim 6 in which said spring is a spiral spring attached to the second indicator at one end and to a part fixed with respect to the container at the other end and adapted to continuously urge the second indicator toward a lower gauge reading position.

* * * * *